United States Patent [19]
Miyazaki

[11] 4,035,044
[45] July 12, 1977

[54] BEARING ASSEMBLY

[76] Inventor: Sadao Miyazaki, 17-10, Kaminoge 4, Setagayaku, Tokyo 158, Japan

[21] Appl. No.: 696,933

[22] Filed: June 17, 1976

[51] Int. Cl.² .................................. F16C 33/30
[52] U.S. Cl. ...................... 308/183; 308/184 R; 308/207 R
[58] Field of Search ............... 308/183, 184 R, 62, 308/207 R

[56] References Cited
U.S. PATENT DOCUMENTS 3,986,753  10/1976  Lindner .................. 308/184 R Primary Examiner—Joseph F. Peters, Jr.
Assistant Examiner—Gene A. Church
Attorney, Agent, or Firm—Olsen and Stephenson

[57] ABSTRACT

A bearing assembly comprising a plurality of outer and inner rings individually having eccentric outer and inner circumferential axes. The rings are disposed successively one inside the other in a manner such that an inner ring slidably rotatably contacts about its outer circumference the inner circumference of its immediately outer ring, and are relatively rotated to easily adjust to bring the axis position of a shaft to be rotatably supported by the bearing precisely to a predetermined reference position. Means is also disclosed, which releasably holds the rings against rotation after the axis position of the shaft is fixed.

10 Claims, 10 Drawing Figures

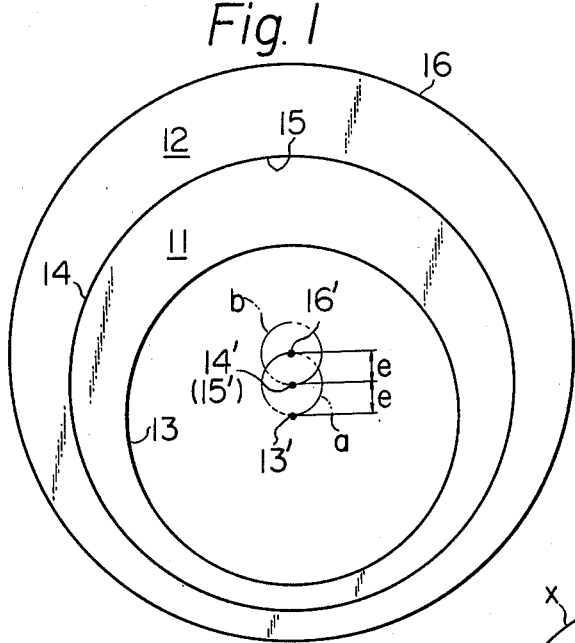
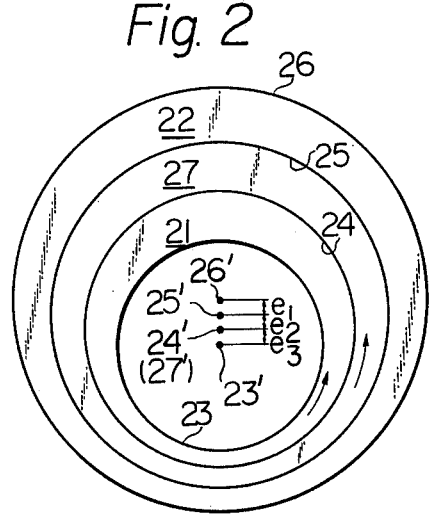
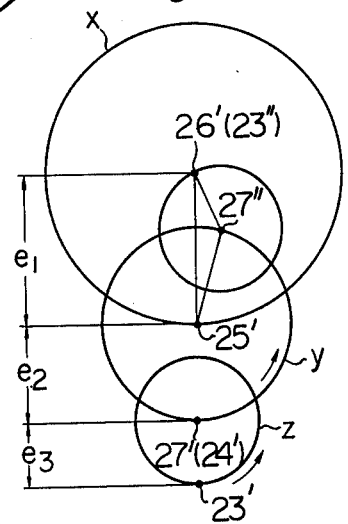
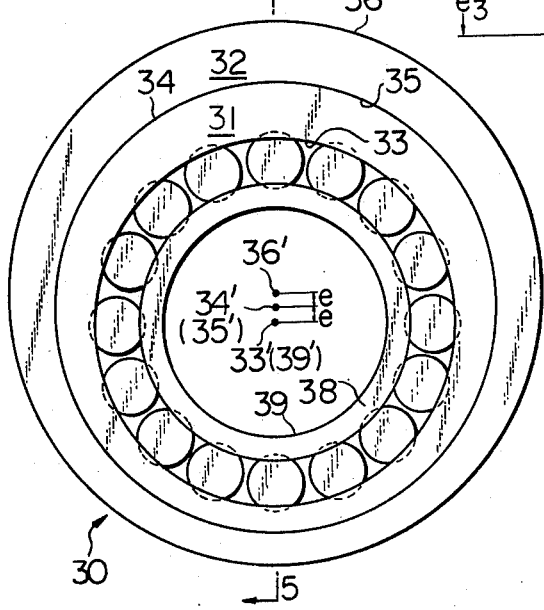
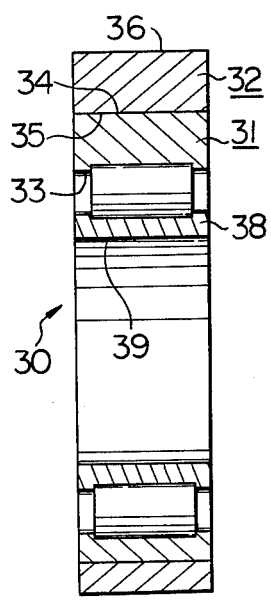

BEARING ASSEMBLY

BACKGROUND OF THE INVENTION

My present invention concerns broadly a bearing assembly easily adjustable to provide precise alignment of the axis of a shaft to be rotatably supported by the bearing and a predetermined reference position or desired position. More particularly, the present invention relates to an adjustable bearing assembly capable of being easily adjusted to precisely compensate for the axial misalignment of a rotatable shaft when the axis of the rotatable shaft is not in true alignment with its predetermind reference position or it is out of alignment with the axis or center of its receiving bore of a machine member for supporting the shaft through a bearing means.

In virtually all modern machines, bearings are used to rotatably support shafts, and with most of the bearing structures today in use the bearing supports a rotatable shaft about the inner circumference of its inner race and is in turn supported with the outer circumference of its outer race fitted within a bore of its supporting member such as a bracket or housing. To properly support a rotatable shaft, the bearing should necessarily have the inner circumferential axis of its inner race precisely aligned with the axis of the shaft and also the outer circumferential axis of its outer race similarly accurately aligned with the axis of the receiving bore.

Today, precise manufacturing of bearings per se can be done relatively with ease. For example, it can be relatively easily carried out to make the inner circumferential axis of the inner race exactly in alignment with the axis of the shaft, and the outer circumferential axis of the outer race with both said axes of the shaft and of the inner circumference of inner race. However, it is not necessarily always easy to have bearings installed in a machine without a misalignment or an error in dimension.

For instance, in having a rotatable shaft supported through a suitable bearing means by a supporting member such as a bracket or housing, it certainly would not involve a particular difficulty to make a bearing receiving bore identically corresponding to the outer cirumference of the bearing outer race. However, if the shaft is to be supported by a pair of axially spaced bearings, it is considerably difficult to obtain true axial alignment of the two bores for receiving the bearings. Obviously more difficult is to dispose two or more shafts in a precisely parallel arrangement in a machine, and for example in order to maintain in good meshing conditions an engageable pair of gears journalled to separate shafts, it is unavoidably practised today to provide a particular mechanism for elastodynamically compensating for any error in the distance between the two shafts or for adjusting the distance between the shafts, whereby the disadvantage is encountered that the gearing has to be complex in structure and relatively large in scale.

As indicated above, even if bearings per se can be manufactured satisfactorily precisely today, it is not always feasible with ease to have the bearings installed in strict alignment with a predetermined position or positions in a machine. Further, if a precise installation of bearings can be made in a machine, when the machine is put for operation for a relatively long period of time the bearings tend to undergo misalignment due to thermal deformation, creeping and so forth. A misalignment which often occurs with the current bearing structures attributable to difficulties to obtain an accurate initial installation of bearings or due to external causes during machine operation, if occurs, would derange the function designed of a machine including bearings and give rise to undesirable phenomena such as abnormal vibration, noises, heat generation and so forth.

SUMMARY OF THE INVENTION

The present invention has overcome these and other difficulties with the existing bearings by providing a novel bearing assembly, which most broadly comprises at least two rings which individually have eccentric outer and inner circumferences and are termed eccentric rings throughout this specification. The plurality of eccentic rings are disposed one inside the other in a manner such that an inner ring will slidably rotatably contacts about its outer circumference the inner circumference of its immediately outwardly disposed ring. The innermost ring can have secured about its inner circumference the outer race of an existing bearing means such as a rolling bearing, or it can be made itself the outer race of such bearing means. The outermost ring is received within a bore of the bearing support member of a machine, such as a bracket or housing. With each ring, the center or axis of its outer circumference and that of its inner circumference are eccentric at a predetermined value, and in the case of a bearing assembly comprising two eccentric rings, the eccentricity of one ring and that of the other ring should be equivalent. With an assembly comprising three rings, the eccentricity values of the rings should be mutually so related as to form the sides of a triangle, and with an assembly composed of four rings, the four eccentricity values should be mutually so related as to form a quadrangular configuration.

As will become clearly understood from consideration of a detailed description of the present invention which will later be taken in conjunction with accompanying drawings, according to the present invention the axis position of a rotating shaft received by an innermost ring can be shifted to a desired distance simply by rotating one or more of the rings. That is to say, if the axis of a shaft is found as not in alignment with a certain reference position, an eccentric ring or rings may be suitably rotated until the axial alignment is obtained of the shaft and the reference position, and thereafter the rings are checked by suitable securing or fastening means against rotation relative to each other or to the stationary support member.

In accordance with the present invention, it is operable even after completion of the overall assemblage of a machine including bearings to let align with the predetermined position or positions the axis position of a rotating shaft received by the bearings. Further, by use of the bearing assembly of the present invention a pair of shafts to be parallel disposed in a machine can be disposed in a strictly parallel arrangement.

Therefore, according to the present invention it is operable with greater ease than before to provide two or more bores for receiving bearings, spaced apart either axially or laterally: If an error should be discovered in an initial axial alignment of the plurality of bores or in the lateral distance between the bores, such can be readily accommodated with use of a bearing assembly of the present invention. Also, although in the past an extreme care is required to take in selecting couplings for connecting two shafts end-to-end so as to minimize an axial misalignment of the shafts, such a difficulty is effectively cancelled in accordance with the present invention. Likewise, it is also possible with the present invention to bring into proper conditions the meshing engagement of two gears mounted on two rotating shafts even during while the shafts and accordingly the gears are rotated. These features of the present invention are greatly conducive to eliminate the occurrence of abnormal vibration, noises, heat generation and so forth of a machine including bearings.

Accordingly, it is the primary object of the present invention to provide a novel bearing assembly adjustable itself to bring to a precise axial alignment the axis of a rotatable shaft which initially is not in alignment with a shaft supporting member or a predetermined reference position.

It is another object of the present invention to provide a precisely adjustable bearing assembly which can be installed in a machine with ease at a reduced cost.

It is still another object of the present invention to provide a precisely adjustable bearing assembly capable of accommodating an axial misalignment even after its installation in a machine.

It is a still further object of the present invention to provide a bearing assembly capable of an easy and precise adjustment of the axis position of a rotatable shaft, adaptable to not only rolling bearings but also plain bearings.

These and other objects, features and advantages of the present invention will become clearly apparent as the specification proceeds to describe the invention with reference to specific embodiments thereof illustrated in the accompanying drawings.

BRIEF DESCRIPTION OF THE DRAWINGS

FIG. 1 is an elevational view taken for an illustration of the basic concept of the present invention;

FIG. 2 similarly is an elevational view, illustrating the basic concept of the present invention in connection with an example thereof in which three eccentric rings are used;

FIG. 3 is a diagrammatic view, showing the circular loci the centers of three eccentric rings of FIG. 2 will trace when the rings are rotated;

FIG. 4 is an elevational view, showing an embodiment of outer and inner eccentric rings in accordance with the present invention, in which the inner ring forms the outer race of a rolling bearing;

FIG. 5 is a sectional view taken on the lines 5—5 of FIG. 4;

DESCRIPTION OF THE INVENTION

Figure 6:
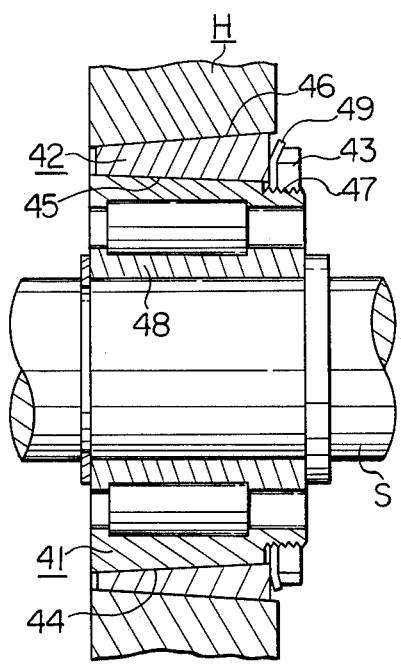
FIG. 6 is a sectional view, showing another embodiment of outer and inner eccentric rings of the present invention, in which the two rings are so structured as to form an example of the ring fastening means of the present invention.

Referring now to the drawings, the present invention will be described in greater detail, and to begin with a brief explanation will be given the basic concept of the invention with reference to FIG. 1 initially, in which inner and outer rings in accordance with the present invention are indicated respectively at 11 and 12, each of which has eccentric inner and outer circumferences. The inner eccentric ring 11 has inner circumference 13 and outer circumference 14 with 13' and 14' as the axes or centers thereof respectively, which are spaced from each other at a linear distance or eccentricity of $e$. Similarly, the outer ring 12 has inner and outer circumferences 15 and 16, respectively, with 15' and 16' as the axes thereof respectively, and axes 15' and 16' have the same eccentricity of $e$. As shown, the diameter of the outer circumference of inner ring 11 substantially corresponds to that of the inner circumference 15 of outer ring 12, and the inner ring 11 is slidably rotatably fitted into the outer ring 12. With this arrangement of the two rings 11 and 12, if the rings are relatively rotated, by this it is feasible to adjust to a desired value the eccentricity of the centers 13' and 16'. Now, outer ring 12 is held rotatably immovable and the other ring 11 is rotated, when the center 13' of the inner circumference 13 of inner ring 11 moves the circular locus $a$ of a radius $e$, with the center 14' of the outer circumference 14 as the center of its circular movement. Likewise, with the inner ring 11 is held against rotation and the outer ring 12 is rotated, then the axis 15' of the inner circumference 15 of outer ring 12 moves the circular locus $b$ of radius $e$, with the axis 16' of the outer circumference 16 as the center of its circular movement. Thus, it will be understood that by rotating the inner and outer rings 11 and 12 relatively at a suitable amount of rotation, the center 13' of the inner circumference 13 of inner ring 11 can take any position within the area defined by a circle having $2e$ as the radius thereof, with the axis 16' of the outer circumference of outer ring 12 as the center of the circle. Also, it will be understood that in order to bring together the inner circumferential center 13' of ring 11 and the outer circumferential center 16' of ring 12, the eccentricity of one ring and that of the other ring must correspond to each other.

The present invention can be effectively worked with use of more than three eccentric rings to attain the same objects and advantages.

FIG. 2 illustrates such an instance in which three eccentric rings are assembled in the same arrangement as mentioned above. The outermost ring indicated at 22 has inner and outer circumferences 25 and 26 and their corresponding axes or centers 25' and 26', which have an eccentricity value of $e_1$. Of the ring in the middle, shown by 27, the outer circumferential center 27' and the inner circumferential center have an eccentricity value of $e_2$. Similarly, the innermost ring 21 has centers 23' and 24', of which the eccentricity value is $e_3$. In the case of this instance, if the rings have different eccentricity values it is feasible to let take the same position the outer circumferential center 26' of the outermost ring 22 and the inner circumferential center 23' of the innermost ring 21, providing the eccentricity values $e_1$, $e_2$ and $e_3$ are mutually so related as to form a triangle having $e_1$, $e_2$ and $e_3$ as sides thereof, as will be described in greater detail with reference to FIG. 3.

In FIG. 3, the circle shown by the symbol $x$, having $e_1$ as the radius thereof, corresponds to the locus that, when the outermost ring 22 is rotated, the axis or center 25' of inner circumference 25 will trace with the center 26' of the outer circumference as the center of its circular movement. Similarly, the circle $y$ is the locus that when middle ring 27 is rotated with its outer circumference along the inner surface 25 of the outermost ring 22 its inner circumferential center 27' will depict with the value $e_2$ as the radius from the center 25'. Likewise, the innermost ring 21 is rotated with its outer circumference along the inner circumference of the middle ring 27, and then the axis or center 23' of the inner circumference 23 of ring 21 will move the circular locus $z$ having $e_3$ for the radius from the center 24' (27').

Now, in FIG. 3 the three rings are supposed to be in an original condition of their disposition, in which the outer circumferential center 26' of the outermost ring 22 and inner circumferential center 23' of the innermost ring 21 lie most distant from each other, linearly. If the middle ring 27 is then rotated a suitable angular distance to bring the center 27' of the same ring to the position corresponding to that of the center 27" and if the innermost ring 21 is also rotated enough angular amount to bring the center 23' to the position of 23", the centers 23" and 26' will become resting on the same position. This means that the center 23' of the inner circumference 23 of the innermost ring 21 has now been brought to the position of the center 26' of the outer circumference 26 of the outermost ring 22.

In this condition of arrangement of three rings, the axes or centers 26' (23'), 25' and 27" are mutually so related as to form a triangle having $e_1$, $e_2$ and $e_3$ as the sides thereof, as shown also in FIG. 3, and insofar as the eccentricity values $e_1$, $e_2$ and $e_3$ of the three rings are in such mutual relationship, it is possible to locate the inner circumferential center 23' of the innermost ring 21 at any optional position within a circular area having $e_1 + e_2 + e_3$ as its radius with the outer circumferential center 26' of the outermost ring as the center of the circle, and also feasible is to let coincide the positions of centers 23' and 26', as before mentioned.

In accordance with the present invention, the same as above can be mentioned also in case where four or more eccentric rings are used, and insofar as the rings have eccentricity values mutually so related as to depict a polygon (triangle inclusive) with themselves as a side of the polygon respectively, it is practicable to make the positions agree of the outer cicumferential center of the largest or outermost one of the rings and the inner cirumferential center of the smallest or innermost ring, and this also applies if the eccentricity values involved have a mutual relationship such that the greatest value of all equals the sum total of the remaining values.

As outlined in the foregoing paragraphs, the present invention has as its basic concept to utilize a plurality of eccentric rings and a principle of relatively transferring the centers or axes of such rings to provide a bearing assembly capable of a precise adjustment to provide axial alignment as required in bearings. Whereas such a bearing structure is known in which the axial alignment of a shaft and the bearing is adjusted with use of a single eccentric ring, in such a structure it is only that the center of either of the two circumferences of the one ring can move a circular locus with the center of the other circumference as the center of the circular movement, whereby the center of the bearing cannot always take an optional position.

The present invention will now be described in further detail in connection with a specific example thereof as illustrated in FIGS. 4 and 5 in particular, In this connection, it is to be understood tht although eccentric rings are used limitedly in the number of two in the example to be considered, this is absolutely for simplicity for description and illustration.

To provide a bearing assembly of the present invention with use of an outer and an inner eccentric rings as shown in FIG. 1, the inner ring 11 will be made the outer race of a rolling bearing or the shaft support portion of a plain bearing, and the outer circumference 16 of outer ring 12 will be made conforming in its configuration and size to the bearing support portion or bore of a bracket or housing. When this bearing mechanism is securely fixed to the housing, it will therefore come that while the center 13' of the innermost circumference 13 corresponding to the axis position of the shaft to be rotatably supported, the center 16' of the outer circumference 16 corresponds to the center or axis of the bearing receiving bore of housing.

In FIGS. 4 and 5, which illustrate an embodiment of the present invention adapted to the instance of a rolling bearing, the numerical reference 30 generically represents the rolling bearing. An inner ring in accordance with the present invention forms the outer race of this bearing 30, as indicated at 31, which has eccentric inner circumference 33 having 33' as the center thereof and outer circumference 34 having 34' as the center thereof, the eccentricity between the two centers or axes 33' and 34' being $e$. The inner race 38 of the bearing has an inner circumference 39, of which the center or axis 39' corresponds in its position to the center or axis 33' of the inner circumference of outer race 31.

According to the present invention, a further eccentric ring as indicated at 32 is employed, surrounding the outer race 31. This outermost ring 32 has an inner circumference 35 of a configuration and diametral size substantially corresponding to those of the outer circumference 34 of the outer race 31 and an outer circumference 36 having its center 36' deviated by a linear distance of $e$ from the center 35' of the inner circumference 35, and is disposed about the outer race 31 by fitting, slidably rotatably along the outer circumference 34 of the outer race. The outer cicumference 36 of ring 32 has essentially the same configuration and size as those of the bearing receiving bore of housing and is fitted into said bore. With the rolling bearing so structured, the center 36' of the outermost circumference 36 conforms to the axis of the bore of housing and the center 33' of the inner circumference 33 of the outer race does to the axis position of a shaft to be supported.

When the bearing assembly of the present invention has been received within the bore of a housing and a shaft with the inner race 38, securely by fitting, an adjustment will be made to bring the axis position of the shaft to optimum position. In accordance with the present invention, such adjustment is operable by rotating a suitable angular degree or degrees either or both of the eccentric ring 32 and the outer race 31. By relatively rotating the race 31 and ring 32, the inner circumferential axis or center 39' of the inner race 38

(i.e., the axis of the shaft) can be moved to take any optional position within a circular area having 2e as the raidus thereof with the center 36' of the outer circumference of the ring 32 as the center of the circle, whereby the shaft can be adjusted to take the most desirable axis position.

When a precise axis position of shaft is obtained, rotatable eccentric rings are necessarily to be fastened against rotation relative to each other and also relative to the stationary housing, and a variety of devices and arrangements therefor are proposed, of which a few examples are illustrated in FIGS. 6 through 10.

In FIG. 6, there is shown an eccentric ring 42 having inner and outer circumference 45 and 46, which have sectional configurations tapered in opposing directions, and is forcibly inserted along complementarily tapered bearing support surface of housing H and outer circumference 44 of outer race 41. At its tapered lower end, the outer race 41 is threaded as indicated by 47 and at the threaded end, engaged by a nut 43 through a washer 49 provided with a suitable rotation preventive means, such as a tongue washer or pawl washer. The symbol S represents a rotatable shaft, which is inserted by fitting into the inner race 48 of the bearing and firmly secured about the inner circumference of the race 48.

To adjust to exact alignment the axis portion of shaft S with the center or axis of the bore of housing H, first the nut 43 will be loosened, and the press fit engagement will be released between the inner circumference 45 of ring 42 and the outer circumference 44 of outer race 41 and that between the outer circumference 46 of ring 42 and the bearing support surface of the housing, respectively. Then, either manually or by use of a suitable tool, the outer race 41 and eccentric ring 42 are relatively rotated a suitable angular distance. When optimum axis position of shaft S is thus obtained, by tightening the nut 43 the ring 42 will again be forcibly inserted into between the outer circumferential surface 44 of outer race 41 and the bearing support surface of housing H, whereby the ring 42 and outer race 41 will become securely received within the bore of the housing. Thus, the axis position of shaft S is now located at optimum position relative to a pedetermined reference position, that is, the center or axis of the bore or the bearing support portion of housing, and the bearing parts are now integrally secured to the housing, ready for performing normal bearing functions. To prevent from occurring any machine trouble during operation such as a dislocation of the axis position of shaft S due to loosening of nut 43, it is proposed to apply the nut through a washer having a suitable rotation preventive means, such as a tongue washer or pawl washer as before mentioned.

Figure 7:
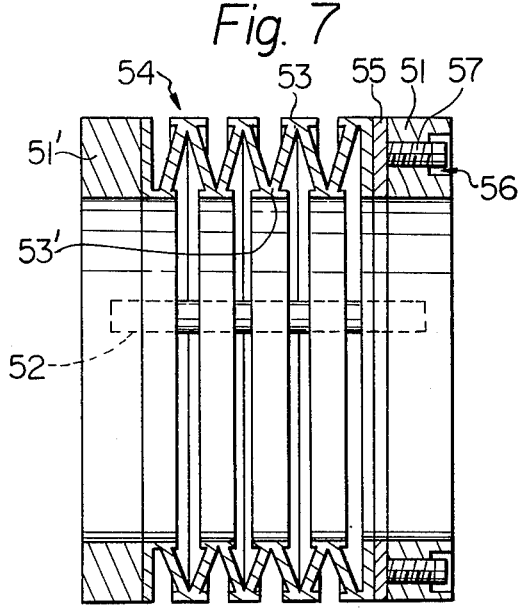
FIG. 7 is a sectional view of another embodiment of the outer ring of the present invention, in which said outer ring itself forms another example of the ring fastening means.

Whereas in the above consideration of the present invention taken in conjunction with FIG. 6, it has been proposed to employ such an eccentric ring as having a tapered sectional configuration so as to provide means for checking rotation of the assembly of rings during machine operation, FIG. 7 illustrates another example of the present invention.

Transferring reference now to FIG. 7, the example therein illustrated is applicable to such a bearing assembly of the present invention which comprises two eccentric rings, one larger than the other. In this example, a pair of rings 51 and 51' formed identical in respect to their sizes and configurations and concentrically secured to each other by a plurality of rod members 52 have interposed therebetween an elastic cylindrical bellows 54 (made of steel, preferably), which has sectionally parallel portions 53 and 53' respectively about the outer and inner circumferences of the rings and which functions the same as the outer ring 12 in FIG. 1 or 32 in FIG. 4.

One end of the bellows 54 is secured to an annular plate member 55 disposed between said one end and the ring 51, the other end being secured to ring 51'. The bellows 54 and plate 55 are formed in a cylindrical configuration having the corresponding eccentricity to the rings 51 and 51', with respect to the centers of the outer circumference and of the inner circumference. By the spring force of bellows 54, the plate 55 is pressed against a side of ring 51, which is provided at its other side with a cavity 56. Within this cavity 56, a plurality of tapped holes are provided axially through the ring 51. By suitably driving bolts 57 threadably engageable with said tapped holes, the annular plate 55 can be moved in axial directions to axially contract or expand the bellows. With the bellows in axially expanded conditions, its portions 53 and 53' respectively lie within the outer and inner circumferences of ring 51 or 51'. However, when it is contracted between the plate 55 and ring 51' by driving the bolt 57 by a suitable tool to axially press the plate, it increases in its outer circumferential diameter, while decreasing in its inner cicumferential diameter, and its portions 53 and 53' become protruding beyond the outer and inner circumferences of the ring 51 or 51', respectively. Thus, simply by axially contracting the bellows 54 enough to let its portions 53 and 53' be pressed against the inner circumferential surface of housing and the outer circumferential surface of the outer race of bearing, respectively, the eccentric rings 51 and 51' and the bearing outer race can become integrally fastened and secured against any relative displacement relative to housing.

Further, the outer and inner circumferential diameters of rings 51 and 51' are different from the diameter of the bearing receiving bore of housing and the outer diameter of the outer race, respectively, so that rings 51 and 51' can slidably rotate freely between the outer race and the housing, if so required for example for adjusting the axis position of the shaft. Also, in the event that the bearing required is relatively small in scale, then eccentric rings 51 and 51' could be made of a relatively thin plate.

Figure 8:
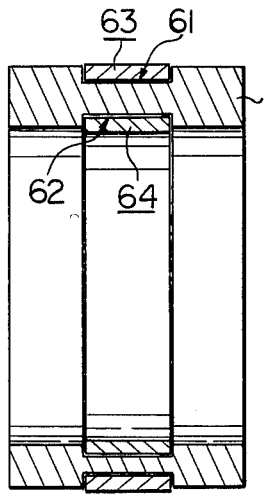
FIG. 8 similarly is a sectional view of a still another example of the fastening means of the present invention.
Figure 9:
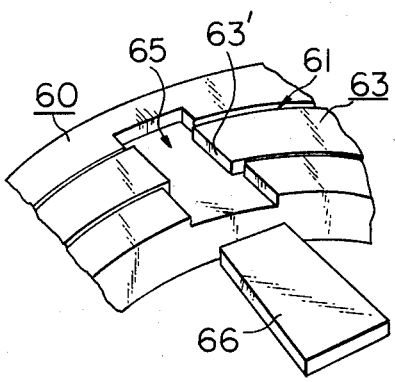
FIG. 9 is a schematic perspective view, taken for an illustration of the manner in which the fastening means of FIG. 8 is applied.
Figure 10:
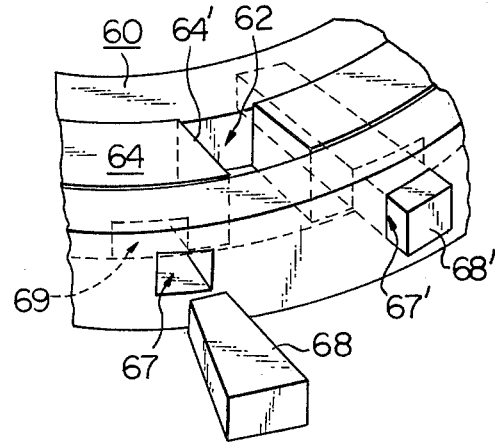
FIG. 10 similarly is a schematic perspective view, also illustrative of the manner in which the fastening means of FIG. 8 is applied.

FIGS. 8, 9 and 10 show a further example of the ring fastening means under consideration, and in FIG. 8 initially, the eccentric ring 60 is provided at its axially central portion with circumferentially continuous cavities 61 and 62 respectively about its outer and inner circumferences. Received within these cavities by fitting are elastic annular bands 63 and 64, which are discontinued at one point respectively.

As shown in enlargement in FIG. 9, the outer elastic band 63, which is fitted into the outer circumferential cavity 61, has its notched ends 63' projecting into a groove 65 axially provided to the outer circumference of ring 60. Although in an original condition as illustrated the outer circumferential surface of band 63 lies below that of ring 60, when a wedge member 66 having a configuration and size essentially corresponding to those of the axial groove 65 and being frictionally engageable intimately with said groove 65 is applied axially into the groove and forcibly against the notched ends 63' of band 63, said band 63 undergoes a radial expansion, allowing its outer circumferential surface to rise beyond that of ring 60. Thus, the outer circumferential surface of the eccenric ring 60 can be forcibly secured about the bearing support surface of housing.

In FIG. 10, there are shown in enlargement the notched end portions 64' of the inner elastic band 64, which are provided with grooves 69 as illustrated. On the other hand, the ring 60 is formed at a side thereof with a pair of suitably spaced tunnels 67 and 67' axially perforated to the annular cavity 62. Due to the elasticity of band 64, the notched ends 64' of the band originally tend to circumferentially depart from each other, and accordingly the inner circumferential surface of the band tends to lie below that of ring 60. Then, when a pair of wedges 68 and 68' having configurations and sizes virtually corresponding to those of tunnels 67 and 67' and intimately engageable with the tunnels are applied under pressure for example by hammering through said tunnels, the ends 64' of the band 64 are caused to near each other. By thus making the ends 64' of band 64 come closer each other forcibly by application of wedges 68 and 68', the band is made reducing its inner circumferential diameter or, in other words, its inner circumferential surface is made lying above that of the ring 60, whereby an immovably contacting engagement can be obtained between said ring 60 and the outer race of the bearing or a next immediately disposed inner ring.

Whereas the present invention has been described with reference to specific examples of operation thereof, many modifications and alternations will become apparent to those skilled in the art without departing from the scope of the invention. For example, the eccentric rings of the present invention may possibly be graduated suitably about their side surfaces so that any required degree of adjustment of the axis position of the shaft can be readily determined simply by viewing or reading the graduation. Also, the herein disclosed arrangment of eccentric rings of the invention can be modified such that each adjacent pair of rings have provided therebetween with a needle bearing or the like, if the bearing required is a heavy, large scale one. Further, the circumferentially continuous ring disclosed in this specification can be readily altered in respect to its configuration; for example, the ring can be composed of arc segments or it can be formed to be concave and convex about its circumferential surfaces. It will also be obvious that the present invention can be effectively utilized in connection with rolling bearings having an outer race of the type generally in use today, by fitting the rolling bearing within the inner circumference of the innermost ring of the invention. Likewise, the present invention can be operated in connection with not only a rolling bearing but also journal bearings and thrust bearings.

Accordingly, it is to be understood that the scope of the present invention is not limited to the specific structures and arrangements disclosed in the foregoing specification and illustrated in the accompanying drawings but is to be limited only by claims which will follow.

It is claimed:

1. A bearing assembly adjustable itself to provide a precise axial alignment of a shaft rotatably supported by the bearing with a predetermined reference position, comprising:

at least two rings each having axes of the outer circumference and the inner circumference eccentric at a predetermined value of eccentricity, said rings being disposed successively one inside the other in a manner such that an inner ring slidably rotatably contacts about its outer circumference the inner circumference of its immediately outer ring, the outermost ring being fitted into a receiving bore of a bearing support member, the innermost ring being fitted about the rotatable shaft receiving the latter through bearing means; and a fastening means releasably holding the rings against rotation relative to each other and said receiving bore.

2. The bearing assembly as claimed in claim 1, wherein two rings are disposed one inside the other, each ring having eccentric outer and inner circumferences, the eccentricity value of one ring being equivalent to that of the other ring.

3. The bearing assembly as claimed in claim 1, wherein three rings are disposed one inside its immediately outer ring, each ring having eccentric outer and inner circumferences, the eccentricity values of the rings being mutually so related as to form the sides of a triangle.

4. The bearing assembly as claimed in claim 1, wherein three rings are disposed one inside its immediately outer ring, each ring having eccentric outer and inner circumferences, the eccentricity value of one ring being equivalent to the total sum of the eccentricity values of the remaining rings.

5. The bearing assembly as claimed in claim 1, wherein four rings are disposed successively one inside its immediately outer ring, each ring having eccentric outer and inner circumferences, the eccentricity values of rings being so related as to form the sides of a quadrangle.

6. The bearing assembly as claimed in claim 1, wherein four rings are disposed successively one inside its immediately outer ring, each ring having eccentric outer and inner circumferences, the eccentricity value of one ring being equivalent to the total sum of the eccentricity values of the remaining three rings.

7. The bearing assembly as claimed in claim 2, wherein the inner ring is made the outer race the of an existing bearing means.

8. The bearing assembly as claimed in claim 2, wherein said ring fastening means includes complementary taperings formed of the outer circumference of the inner ring and of the inner circumference of the outer ring, complementary taperings formed of the outer circumference of the outer ring and of the inner circumference of said receiving bore, a threaded groove provided to the inner ring, and an engageable nut.

9. The bearing assembly as claimed in claim 2, wherein the outer ring comprises an elastic annular bellows and wherein means is provided to axially press said bellows to forcibly expand its outer circumference radially outwardly and its inner circumference radially inwardly.

10. The bearing assembly as claimed in claim 2, wherein said ring fastening means comprises annular cavities provided about the outer and inner cicumferences of either or both of the rings, partly notched annular flexible bands received within said annular cavities, and means for forcibly expanding said bands radially about their notched portions to thereby projecting the outer band outwardly and the inner band inwardly.

* * * * *

UNITED STATES PATENT OFFICE
CERTIFICATE OF CORRECTION

Patent No. 4,035,044                    Dated July 12, 1977

Inventor(s) Sadao Miyazaki

It is certified that error appears in the above-identified patent and that said Letters Patent are hereby corrected as shown below:

Column 6, line 61, "with" should be --within--.

Column 10, claim 7, line 42, "is made the outer race the of" should read --is made the outer race of--.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*